(12) United States Patent
Good et al.

(10) Patent No.: US 6,314,404 B1
(45) Date of Patent: *Nov. 6, 2001

(54) METHOD AND APPARATUS FOR MANAGING REAL ESTATE BROKERAGE REFERRALS

(76) Inventors: Robert O. Good, 864 Old Hickory Rd., Pittsburgh, PA (US) 15243; Nathan C. Skinner, 227 Lexington Ave., Aspinwall, PA (US) 15215; Daniel Greenwood, 5845 Philips Ave. #2, Pittsburgh, PA (US) 15217

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/250,942

(22) Filed: Feb. 18, 1999

(51) Int. Cl.[7] ..................... G06F 17/60
(52) U.S. Cl. ................. 705/1; 705/14; 705/27
(58) Field of Search .................. 705/1, 8, 14, 27

(56) References Cited

U.S. PATENT DOCUMENTS

| | | | |
|---|---|---|---|
| 5,359,508 | * 10/1994 | Rossides | 705/30 |
| 5,584,025 | * 12/1996 | Keithley et al. | 707/104 |
| 5,664,115 | * 9/1997 | Fraser | 705/37 |
| 5,754,850 | * 5/1998 | Janssen | 707/104 |
| 5,832,497 | * 11/1998 | Taylor | 707/104 |
| 6,023,687 | * 2/2000 | Weatherly et al. | 705/38 |
| 6,041,310 | * 3/2000 | Green et al. | 705/27 |
| 6,049,781 | * 4/2000 | Forrest et al. | 705/30 |
| 6,185,683 | * 2/2001 | Ginter et al. | 713/176 |

FOREIGN PATENT DOCUMENTS

| | | | |
|---|---|---|---|
| 08315006-A | * 11/1996 | (JP) | G06F/17/60 |

OTHER PUBLICATIONS

User Agreement, iWant [online], Retrieved on: May 15, 2000. Retrieved from: Internet:<URL: http://www.iwant.com/user_agreement.html>.*

Dezube, D., 'Hold On to Your Wallet: Referral Fees Are Growing', Oct. 1996, National Association of Realtors©, p. 42–44, Retrieved from: Today's Realtor [online]. Retrieved on: May 15, 2000.*

"Real Estate internet company teams with largest wholesale lender in the country", PR Newswire, May 27, 1998, PR Newswire Association, Inc.*

* cited by examiner

*Primary Examiner*—James P. Trammell
*Assistant Examiner*—Calvin L. Hewitt, II
(74) *Attorney, Agent, or Firm*—Paul A. Beck & Associates

(57) ABSTRACT

A method for managing real estate brokerage referrals in which the referrals are made by a broker for residential real estate. A geographically categorized real estate list is created and reviewed by a potential tenant. From this list the potential tenant makes a selection of a desired apartment complex. An individual referral fee agreement is generated which is specific to the potential tenant and to the specific desired apartment complex. The agreement that is generated is provided to the potential tenant who delivers the agreement to the agent for the desired apartment complex for acceptance by that agent. A broker computer system stores a database of real estate rental listings and is programmed for generating an online brokerage referral fee agreement specific to the potential tenant and the apartment complex when the potential tenant makes a selection of a specific complex from a database. The generated agreement is processed for transfer to a potential tenant computer data processor which provides the brokerage referral fee agreement to the tenant for presentation to the agent for the apartment complex for acceptance.

4 Claims, 2 Drawing Sheets

Critical Path Flow Diagram

METHOD AND APPARATUS FOR MANAGING REAL ESTATE BROKERAGE REFERRALS

FIELD OF THE INVENTION

This invention relates to a method and apparatus for managing real estate brokerage referrals by a broker for residential real estate rentals by a potential tenant. It is directed to the method of handling referral fees and the relationship among the broker, the tenant, and the owner of an apartment complex rental.

DEFINITION OF TERMS

1. A real estate brokerage referral means
    Referrals made by a duly licensed real estate broker for earning a commission
2. A broker means
    An individual or business entity duly licensed to transact business for others to earn a commission
3. A potential tenant means
    Individual(s) potentially acceptable to an apartment complex that legally and economically are able to sign a lease to become a tenant
4. A geographically categorized real estate listing means
    Real estate sorted by country, state/province, county, city/township/municipality/etc., or by postal zip code
5. A desired apartment complex means
    A single apartment complex selected for possible occupancy by a potential tenant
6. A geographical location means
    A place selected by zip code, country, state/province, county, city/township/municipality/etc.,
7. An individual referral fee agreement means
    a real estate brokerage contract for an apartment complex to pay a referral fee to a broker for directing a potential tenant to their apartment complex if the potential tenant signs a lease for that property. The real estate brokerage contract is only for that particular individual(s) and that particular apartment complex designated by the written contract.
8. An agent for the desired apartment complex means
    Anyone legally authorized to sign obligations for the owner of the apartment complex
9. A referral fee means
    A commission earned by a broker for directing an individual(s) to a person or business entity to accomplish a business transaction
10. A real estate lease means
    A written contract by which one party gives to another party the use and possession of real estate for a specified time for fixed payments
11. A rental unit means
    Real estate leased for occupancy by people to live in
12. An inducement benefit package means
    One or more products or services with economic value given to the tenant as an inducement
13. A broker computer system means
    A computer system as in definition number 21 used by a broker
14. A database of real estate rental listings means
    A Relational Database Management System (RDBMS) for the storage and retrieval of information on property for rent
15. An online brokerage referral fee agreement means
    A written contract for earning a commission created by a broker that is accessible on a computer system
16. A transfer means
    Transmitting as binary-encoded information from one computer system to another.
17. A potential tenant computer data processor means
    A computer system used by a potential tenant.
18. A storage medium means
    Any device attached to a computer system which is capable of long-term storage of data. Specifically, the data must persist across power-cycling of the computer system, and through disconnection of the device from the computer system. The device stores or retrieves data as directed by the computer system.
19. Encoded means
    Transforming information into binary code understandable or transferable by computer.
20. A computer system means
    A device commonly referred to as a "computer" including, but not limited to, a central processing unit (CPU), random access memory (RAM), persistent storage media, and an interface to a telecommunication network.
21. A broker computer processor means
    A computer system used by the broker.

BACKGROUND OF THE INVENTION

Apartment leasing is a 6 billion dollar a year business. Approximately 40% of America's households are renters. Furthermore, 33% of all apartments turnover annually. This equates to approximately 10,000,000 new leases per year. Tenants move frequently because of job status, transfers, changes in financial, marital, and familial status, the need for more or less living space, medical and old age needs, and home purchases. Fortunately for apartment owners, this dynamic environment does not, in the short run, change the total number of renters in the market. Apartment owners, however, must find ways to attract new residents every month or risk economic losses. Apartment owners are looking for ways to increase the probability that qualified tenants will want to move into their apartments.

National, state and local markets have historically reported annual vacancy rates of between 4% and 10% in larger (over 30 units) apartment complexes. Because of this, the need to market continuously is more prevalent than ever. Maintaining a constant flow of prospective renters through the leasing office is necessary for stabilizing the occupancy of a property. Given the opportunity, apartment owners would rather pay a fee to a broker to fill a vacancy immediately, rather than wait until they are able to fill it themselves. This is especially true, given that the brokerage fee is worth, on average, only 18 days of a 1 year lease. Brokerage fees have become an acceptable alternative to vacancy and are considered both part of the marketing campaign and a line item expense in the budget. The higher occupancy level achieved with the aid of tenant brokers allows the apartment owner to raise rents at a faster rate.

Apartment complexes rely on a combination of media for their advertising, including local rental guide magazines, classified newspaper or display ads, radio, TV, and the Internet. All of these advertisers charge money up front regardless of results. The tenant broker is the only marketing source which requires no up front expense and is paid strictly for results. It is unlikely that out of town renters, which are an integral part of the larger pool of applicants required by larger properties, will find the property's local advertising. The Internet provides a solution to this problem.

Because of the scope of the Internet, the marketing strategies of apartment complexes are beginning to change.

Apartment owners recognize that online rental guides on the Internet offer an inexpensive way to reach apartment shoppers. Even local Apartment Associations and Chambers of Commerce offer searchable listings on the Internet. Many such services charge a fee to properties which advertise on them.

Of greater significance is the fact that property owners and managers recognize that a homepage on the World Wide Web is an inexpensive way to directly communicate with both local and out of town apartment shoppers, and are beginning to create more informative homepages. Property owners and management companies will soon offer maintenance and service information on the Internet. Residents will be able to pay their rent, file a service request, renew their lease, give notice to terminate, and order electric or cable TV service, all over the Internet.

Properties which have their own homepage can place it on multiple search engines or aggregators to increase the number of visits to their page. Also, it is possible for the property to publish its rental information on multiple online services. One online service might offer a great "virtual tour", while another service might offer better maps or the ability to display floor plans. This redundancy of information is creating it's own marketplace and competition.

The prevailing online service business model is to have the property pay to be listed on the site and to permit potential tenants to view the information for free. The service providers charge these fees to cover their sales and marketing costs and to cover overhead. These fees, together with the incidental revenues from banner advertising, create their entire income stream.

The Internet has given the apartment search process a new dimension. Issues of location, pricing, features, amenities, services, and availability can now be considered before the tenant contacts the property. Tenants can even view virtual tours of properties online and thereby reduce the amount of time they spend physically touring. Employers and tenants realize that one or two days spent visiting apartments is often a waste of time and resources. The apartment search shouldn't be labor intensive and expensive; it should be information intensive and inexpensive.

SUMMARY OF THE INVENTION

The present invention provides a method and system for managing real estate brokerage referrals for residential real estate rentals. Real estate listings which are categorized geographically for review by a potential tenant are generated. The geographically categorized real estate listings are presented to the potential tenant for review. The potential tenant makes a selection of a desired geographical location and a desired apartment complex within that geographical location. A real estate brokerage referral agreement specific to the potential tenant and specific to the desired apartment complex is generated for future acceptance by an agent for the desired apartment complex. The real estate brokerage referral agreement is then delivered to the tenant who then delivers the real estate brokerage referral agreement to the agent for the apartment complex for acceptance by the agent.

The agreement is signed by the agent and returned to the broker and a referral fee identified in the agreement is paid by the agent to the broker when the potential tenant signs a real estate lease for a rental unit. The broker then provides the potential tenant with a previously promised inducement benefit package after the potential tenant signs the real estate lease.

A broker computer system stores a database of real estate rental listings and is programmed for generating an online brokerage referral fee agreement which is specific to a potential tenant and an apartment complex upon selection of a specific apartment complex by a potential tenant. The specific apartment complex by the potential tenant is selected from a database. The brokerage referral fee agreement is created for transfer to a potential tenant computer data processor which receives the agreement. This enables the tenant to access the brokerage referral fee agreement to present to an agent for the apartment complex for acceptance.

Used with this system is a storage medium encoded with machine-readable computer program code used in a computer system for managing residential real estate referrals. The storage medium is programmed for causing a broker computer processor to generate an online brokerage referral fee agreement which is specific to a potential tenant and to a specific apartment complex. The specific apartment complex is retrieved from a database of geographically categorized real estate listings and the brokerage referral fee agreement is transferred to a potential tenant computer processor.

The method and apparatus of the present invention is to provide a Web site tool that tenants will use to help them with their apartment search, and although it has some similarities to other Internet services, it will save both novices and devotees of the Internet time and effort because of the comprehensive nature of the broker database. The broker Web site for the present invention can become the sum total of all of the existing apartment information services by virtue of linking, and therefore provide the largest apartment database on the Internet. The incentive package that tenants will receive by selecting one of the broker member apartment complexes will be a major incentive to use the method and apparatus of the present invention. These features of the invention Web site are not currently being offered by any other apartment search providers in the Internet.

The present invention utilizes a proprietary Web site to market, administer and communicate with apartment owners, brokers, and staff with real-time control over information, yet requires no manual intervention while it is providing information to potential tenants. All transactions may be carried out online.

In this novel approach to apartment marketing, the broker will offer the access of its Web site to apartment owners free of charge, and offer a value added incentive benefit package to potential tenants that select an apartment from participating member properties. Revenues are generated from referral fees paid to the broker or from the purchase of incentive packages through the broker by apartment owners or agents for the desired apartment complex.

BRIEF DESCRIPTION OF THE DRAWINGS

Other objects and advantages appear hereinafter in the following description and claims. The accompanying drawings show, for the purpose of exemplification, without limiting the invention or claims thereto, certain practical embodiments of the invention wherein:

DETAILED DESCRIPTION OF A PREFERRED EMBODIMENT

Figure 1:
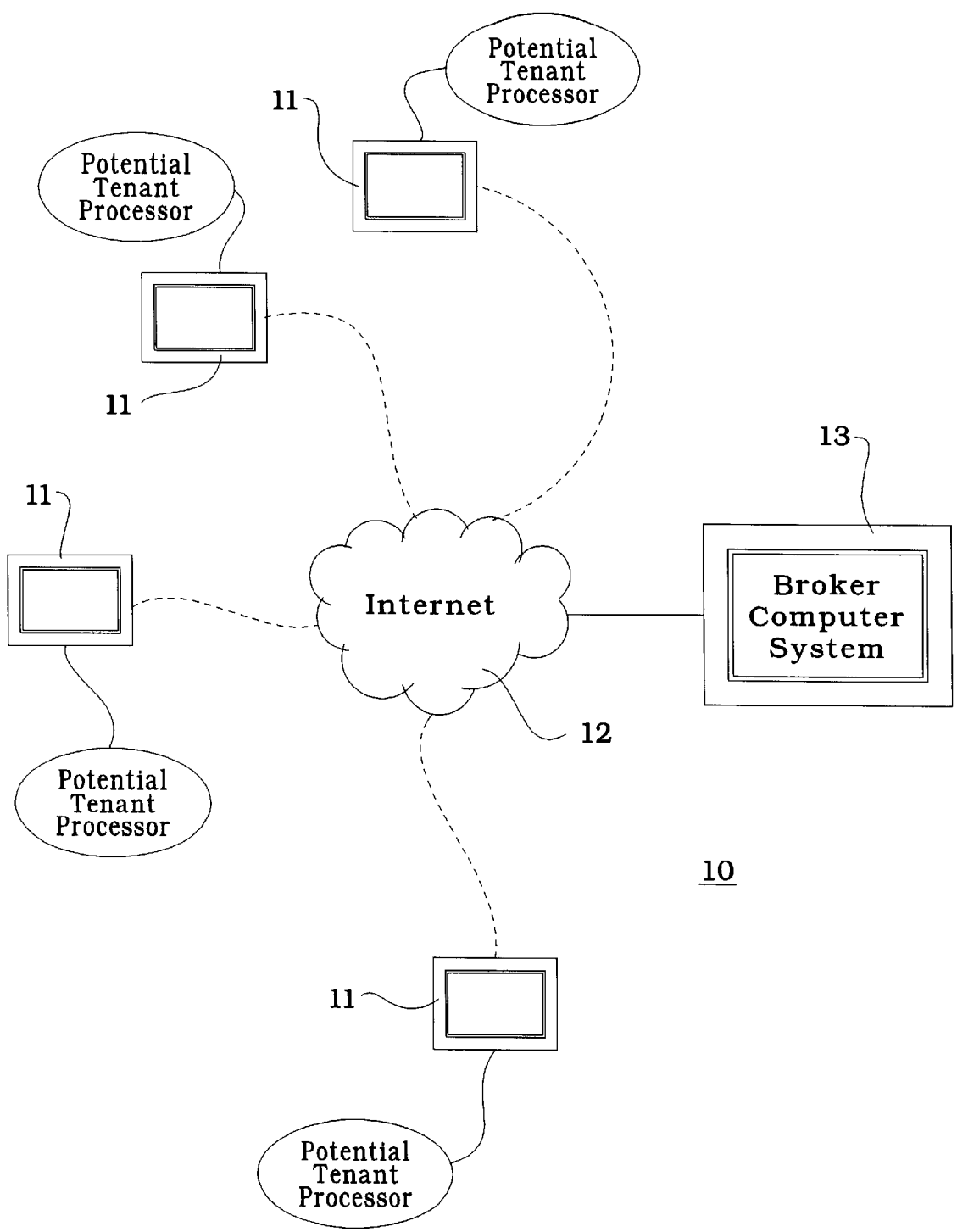
FIG. 1 is a schematic block diagram providing a diagrammatic overview of the computer system of the present invention which may be utilized to practice the method of the present invention.

Referring to FIG. 1, a diagrammatic overview of the computer system 10 is illustrated for providing apparatus to perform the method of the present invention for managing real estate brokerage referrals. This system 10 includes potential tenant personal computers or computer processors 11, the Internet telecommunication network 12 and a broker computer system 13. The heart of the apparatus of the present invention resides in the software enablement of the broker computer system 13 to perform the method of the present invention and transfer or communicate the results to the potential tenant computer processors 11 via the Internet 12.

Figure 2:
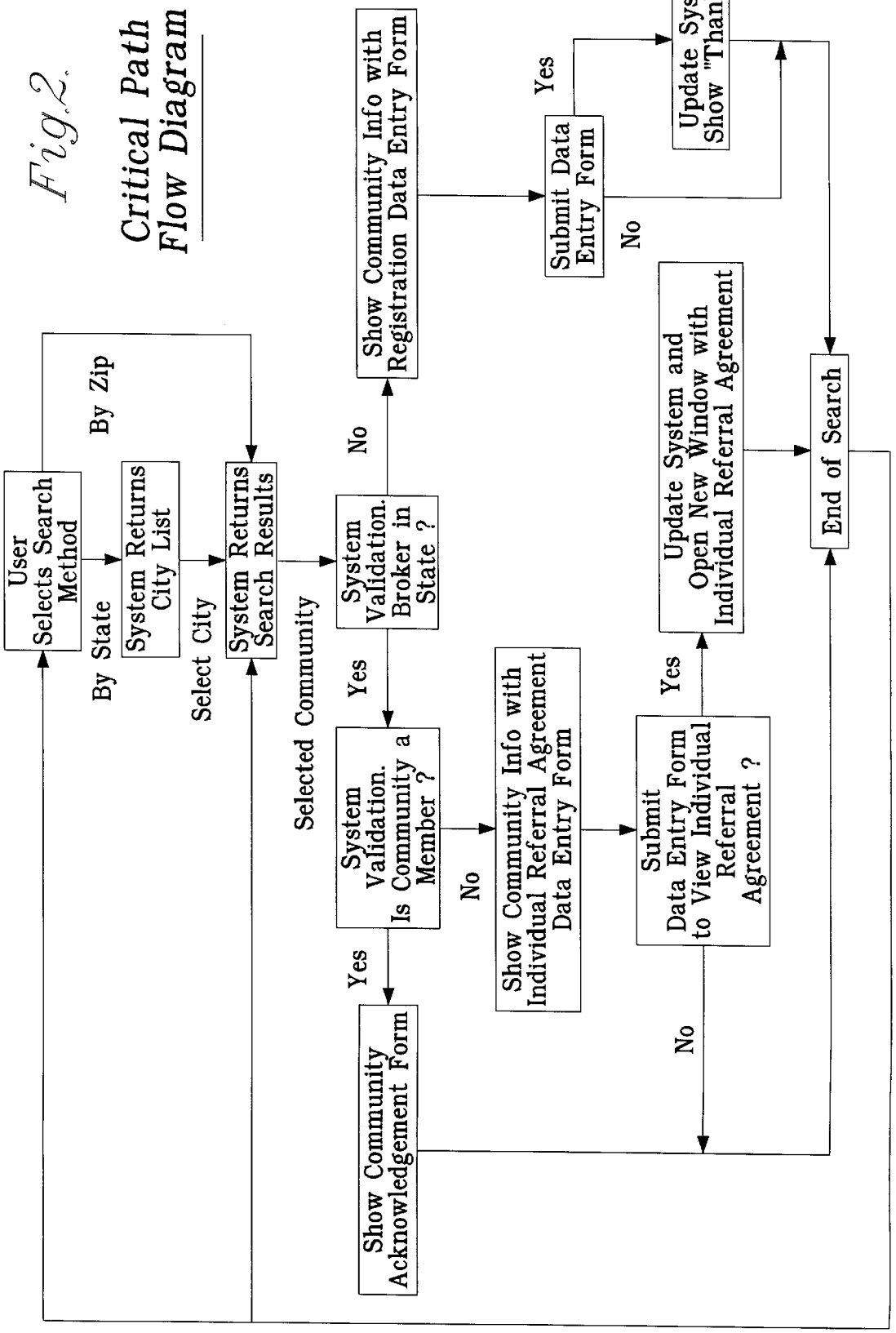
FIG. 2 is a software flowchart for brokerage referral functions carried out by the broker computer system portion of the overall system depicted in FIG. 1.

The software utilized for enabling the broker computer system 13 of the present invention to perform the method of the present invention is illustrated in the software flowchart of FIG. 2. This software flowchart is self-explanatory to those of ordinary skill in the art of computer programming. It will be understood that a computer programmer of ordinary skill upon viewing the software flowchart of FIG. 2 will be readily capable of writing the necessary program to carry out the functions displayed and required in order to operate the broker computer system of the present invention as described and claimed.

The broker computer system 13 has the required database management software running on the broker computer processor of system 13 for managing the database of information relating to real estate available for rent which is created by the data management software and stored in the database management software of the system.

The broker computer system 13 behaves as a server computer system enabling it to respond to requests from potential tenant computer systems or computer processors 11 connected to the server of the broker computer system 13 across a telecommunication network indicated as the Internet 12.

The broker computer system 13 is programmed to receive binary-encoded information from and send binary-encoded information to potential tenant computer processor units 11 across the telecommunication network or Internet 12. It is further programmed to enable it to accept requests for specific information from potential tenants which send such requests to the broker computer system as binary-encoded information.

The broker computer system 13 is further programmed to enable it to retrieve the requested information from the database, format the information, and transmit the information to the potential tenant computer processors 11 across the Internet 12 of telecommunication networks in a form whereby the potential tenant computer system or processor 11 will be able to decode and interpret the information. The system 13 is further programmed to enable it to generate a brokerage referral fee agreement and encode and transmit it to potential processor or computer system 11 across the Internet 12 in a way such that the potential tenant computer system or processor 11 can be decoded and interpret the agreement.

The system is also programmed for enabling it to receive, decode, and interpret requests from the potential tenant computer data processors 11 for such agreements to be generated.

An example of the operation of the method of the present invention for managing real estate brokerage referrals by a broker for residential real estate rentals is presented hereinafter.

A potential tenant, through the potential tenant's computer processor 11 and the Internet 12, enters the broker's Web site in the broker computer system 13 and chooses to search for an apartment either by zip code or by state. Searching by state means indicating to the system which state the potential tenant is interested in finding listings. For example, by selecting a state from a drop-down selection form element and submitting the form.

Searching by zip code means indicating to the system which zip code the potential tenant is interested in finding listings. For example, entering a zip code into a text field form element and submitting the form.

If the potential tenant searches by state, the potential tenant is shown an intermediate page with a list of available cities generated dynamically by the broker computer system 13. The potential tenant then indicates to the system which city the potential tenant is interested. For example, if each city in the list is a hyperlink, the potential tenant would activate the relevant hyperlink. Accordingly, either from the city list or directly in response to the zip code search, the system presents the list of apartment complexes satisfying the search criteria.

The potential tenant then indicates to the system about which community the potential tenant would like more information. For example, if each apartment complex is presented as a hyperlink, the potential tenant activates the appropriate hyperlink for the community the potential tenant is interested in. In response to that potential tenant input, the information available on the specified apartment complex is displayed to the potential tenant.

In addition, the broker computer system 13 determines whether the apartment complex is in a state with a registered broker, and whether the apartment complex is not a member of the broker—s referral system.

With this determination, the potential tenant is automatically presented with an interactive online form through which the potential tenant can provide, at a minimum, the potential tenant's name, which is used to generate an individual referral agreement specific to the potential tenant and the apartment complex upon submission of the tenant information. A sample of such a customized individual referral agreement presented to the potential tenant for downloading is attached as Exhibit A.

The individual referral agreement can then be printed by the potential tenant and presented to the apartment complex by the potential tenant directly or otherwise. An agent for the apartment complex must complete and return the individual referral agreement to the broker in order for the potential tenant to obtain a previously promised inducement benefit package and also for the broker to collect a referral fee.

In summary, the broker computer system 13 is programmed to provide the unique method of the present invention for managing real estate brokerage referrals by a broker for residential real estate rentals by a potential tenant.

The broker computer system is programmed for generating geographically categorized real estate listings for review by a potential tenant, and the listings are presented to the potential tenant for review and selection of a desired apartment complex within the geographical location. An individual referral fee agreement specific to the potential tenant and specific to the desired apartment complex, is generated for further acceptance by an agent for the desired apartment complex and this agreement is delivered to the potential tenant for delivery by the potential tenant to the agent of the apartment complex for acceptance.

We claim:

1. A method for managing real estate brokerage referrals by a broker for residential real estate rentals by a potential tenant comprising:

(a) generating geographically categorized real estate listings for review on a potential tenant's computer data processor by the potential tenant from a database of the generated real estate listings on a broker computer system;

(b) presenting the listings to the potential tenant on a potential tenant computer data processor for review and selection by the potential tenant of a desired apartment complex within a geographical location;

(c) generating on the broker computer system by the potential tenant inserting the potential tenant's name on an individual online brokerage referral fee agreement specific to the potential tenant and specific to the desired apartment complex and specific to the broker who is not the potential tenant for future acceptance by an agent for the desired apartment complex;

(d) accessing the online brokerage referral fee agreement by the potential tenant on the potential tenant's computer data processor for which there is no other interaction between the potential tenant and the broker for creation and execution of the online brokerage referral fee agreement;

(e) delivering by the potential tenant to the agent for the desired apartment complex the brokerage referral fee agreement for acceptance by the agent for the desired apartment;

(f) signing the referral fee agreement by the agent and returning to the broker and a referral fee identified in the referral fee agreement is paid by the agent to the broker when the potential tenant signs a real estate lease for a rental unit; and (g) the broker providing the potential tenant with a previously promised inducement benefit package after the potential tenant signs the real estate lease.

2. An apparatus for managing residential real estate rental referrals comprising a broker computer system storing a database of real estate rental listings and programmed for generating an online brokerage referral fee agreement specific to a potential tenant, broker and an apartment complex upon selection of a specific apartment complex by the potential tenant from the database for transfer to a potential tenant computer data processor for presentation to an agent for the apartment complex for acceptance, whereby the broker provides the potential tenant with a previously promised inducement benefit package after the potential tenant signs the real estate lease.

3. The apparatus of claim 2 including a potential tenant computer data processor for receiving the agreement.

4. A storage medium encoded with machine-readable computer program code used in a computer system for managing residential real estate referrals, the storage medium programmed for causing a broker computer processor to generate an online brokerage referral fee agreement specific to a potential tenant, broker and an apartment complex upon selection with a potential tenant computer processor of a specific apartment complex by a potential tenant from a database of geographically categorized real estate listings for transfer of the agreement to the potential tenant computer processor, whereby the broker provides the potential tenant with a previously promised inducement benefit package after the potential tenant signs the real estate lease.

* * * * *

UNITED STATES PATENT AND TRADEMARK OFFICE
CERTIFICATE OF CORRECTION

PATENT NO. : 6,314,404 B1
DATED : November 6, 2001
INVENTOR(S) : Robert O. Good, Nathan C. Skinner and Daniel Greenwood It is certified that error appears in the above-identified patent and that said Letters Patent is hereby corrected as shown below:

<u>Column 6,</u>
Line 29, delete "broker--s" and insert -- brokers --.
Line 39, insert the attached Individual Referral Agreement labeled "Exhibit A".

Signed and Sealed this

Twelfth Day of November, 2002

Attest:

Attesting Officer

JAMES E. ROGAN
Director of the United States Patent and Trademark Office

Apartmentfinder - Free Apartment Rental Directory - Individual Referral Agreement   Page 1 of 1

Main Street Apartments
100 Main Street
Anytown, USA 00000

Dear Authorized Representative of Main Street Apartments,

ABC Realty, through Apartmentfinder has referred John Doe to Main Street Apartments as a prospective tenant. Apartmentfinder would like you to sign this Individual Referral Agreement so that John can collect our Benefit Package after moving into your community.

If your leasing program includes referral fees to real estate brokers or referral services then you already understand this type of agreement. If you have any questions, please call Apartmentfinder toll-free at 1-800-000-0000. We offer the largest online apartment referral network, and have made every effort to make it easy to use. Apartmentfinder has helped thousands of people across the country find new apartments. Please visit our Web site at http://www.Apartmentfinder.net Please sign and return this Agreement to the address at the bottom of the page.

Thank you.

---

INDIVIDUAL REFERRAL AGREEMENT

1. This Agreement, made February 15, 1999, is between ABC Realty, a licensed real estate brokerage business in the State of Anystate, through the services of Apartmentfinder, Inc. a Anystate corporation that operates a proprietary Internet apartment rental advertising service, and Main Street Apartments, whose authorized representative herein below represents he/she/it has full legal authority to enter into this Agreement for Main Street Apartments, located at 100 Main Street, Anytown, USA 00000.

2. Main Street Apartments acknowledges that John Doe has been introduced to Main Street Apartments by ABC Realty, through Apartmentfinder. Main Street Apartments agrees to pay a referral fee to ABC Realty which shall be (i) in the case of a lease term of one year or longer, 4.167% of the total rent payable pursuant to the lease for the first 12 months thereof; (ii) if the lease is for a term of less than one year, 4.167% of the total rent payable pursuant to the lease; (iii) in no event less than $250.00. The referral fee shall be earned by ABC Realty when the lease is signed and is payable to ABC Realty and should be remitted directly to "Apartmentfinder, Inc.; P.O. Box 000; Anytown, USA 00000" upon John Doe's move-in-date.

3. Main Street Apartments and its representatives agree to comply with all applicable federal, state and local laws pertaining to anti-discrimination and tenant's rights.

4. This is the entire Agreement between the parties. This Agreement shall apply to this referral only and any changes thereto must be made in writing and signed by all parties to the Agreement.

| Agreed to for Main Street Apartments, 100 Main Street, Anytown, USA 00000 Phone (800) 000-0000<br>BY: _____<br>   Authorized Representative      Date | Agreed to for ABC Realty, 00 Market Street, Anytown, USA 00000  Phone (800)-000-0000<br>BY: _____<br>(A signed copy will be mailed to the property.)   Date |

Fax signed Agreement to 1-800-000-0000 or mail to Apartmentfinder, Inc. P.O. Box 000, Anytown, USA 00000

EXHIBIT "A"